(12) United States Patent
Gill et al.

(10) Patent No.: US 9,953,190 B2
(45) Date of Patent: Apr. 24, 2018

(54) SYSTEM INCLUDING A PORTABLE STORAGE DEVICE EQUIPPED WITH A USER PROXIMITY DETECTOR AND METHOD OF PREVENTING THE LOSS THEREOF

(71) Applicant: LPDP Technologies Ltd., Ashdod (IL)

(72) Inventors: Abraham Gill, Ashdod (IL); Avi Hadad, Ashkelon (IL)

(73) Assignee: LPDP Technologies Ltd., Ashkelon (IL)

( * ) Notice: Subject to any disclaimer, the term of this patent is extended or adjusted under 35 U.S.C. 154(b) by 0 days.

(21) Appl. No.: 14/929,446

(22) Filed: Nov. 2, 2015

(65) Prior Publication Data

US 2016/0055353 A1    Feb. 25, 2016

Related U.S. Application Data

(63) Continuation of application No. 11/990,629, filed as application No. PCT/IL2006/000967 on Aug. 20, 2006, now Pat. No. 9,177,453.

(Continued)

(51) Int. Cl.
*G06F 21/34* (2013.01)
*G06F 21/79* (2013.01)
*G06F 21/35* (2013.01)
*G08B 13/14* (2006.01)
*G08B 21/02* (2006.01)
(Continued)

(52) U.S. Cl.
CPC .............. *G06F 21/79* (2013.01); *G06F 21/35* (2013.01); *G06F 21/62* (2013.01); *G06F 21/88* (2013.01); *G08B 13/1427* (2013.01); *G08B 21/0213* (2013.01); *H04W 4/023* (2013.01);
(Continued)

(58) Field of Classification Search
CPC ...... G08B 13/1427; G06F 21/34–21/35; G06F 21/60–21/645; G06F 2212/2146; H04L 63/0492
See application file for complete search history.

(56) References Cited

U.S. PATENT DOCUMENTS 5,774,876 A    6/1998 Woolley et al.
7,002,473 B2   2/2006 Glick et al.
(Continued)

FOREIGN PATENT DOCUMENTS

WO    WO 2005/020172    *    3/2005
WO    WO 2007/020650         2/2007

OTHER PUBLICATIONS

International Preliminary Report on Patentability dated Feb. 28, 2008 From the International Bureau of WIPO Re.: Application No. PCT/IL2006/000967.
(Continued)

*Primary Examiner* — Nicholas Simonetti

(57) ABSTRACT

A portable storage system. The portable storage system comprises a portable storage device having a flash memory element and a loss-prevention unit. The portable storage system further comprises Master and Slave proximity elements. One of the proximity elements is physically connected with the portable storage device, while the other is physically connected with the loss-prevention unit. The Master proximity element is configured to wirelessly determine the presence of the Slave proximity element within a predefined range.

20 Claims, 6 Drawing Sheets

Related U.S. Application Data

(60) Provisional application No. 60/709,125, filed on Aug. 18, 2005.

(51) Int. Cl.
*G06F 21/62* (2013.01)
*G06F 21/88* (2013.01)
*H04W 4/02* (2018.01)

(52) U.S. Cl.
CPC ............... *G06F 2212/2146* (2013.01); *G06F 2221/2153* (2013.01)

(56) References Cited

U.S. PATENT DOCUMENTS

| | | | | |
|---|---|---|---|---|
| 2002/0158751 | A1* | 10/2002 | Bormaster | G06K 7/0008 340/10.2 |
| 2003/0074319 | A1* | 4/2003 | Jaquette | G06F 21/6218 705/51 |
| 2003/0204526 | A1* | 10/2003 | Salehi-Had | G06F 21/35 |
| 2004/0123106 | A1* | 6/2004 | D'Angelo | G06F 21/32 713/171 |
| 2004/0178907 | A1* | 9/2004 | Cordoba | G08B 13/1427 340/539.21 |
| 2005/0048917 | A1* | 3/2005 | Weng | G06F 21/79 455/41.2 |
| 2005/0091338 | A1* | 4/2005 | de la Huerga | A61J 1/1437 709/217 |
| 2005/0134459 | A1* | 6/2005 | Glick | G08B 13/1427 340/572.1 |
| 2009/0182931 | A1 | 7/2009 | Gill et al. | |

OTHER PUBLICATIONS

Applicant-Initiated Interview Summary dated Feb. 13, 2013 From the US Patent and Trademark Office Re. U.S. Appl. No. 11/990,629.
International Search Report and the Written Opinion dated Jan. 15, 2007 From the International Searching Authority Re. Application No. PCT/IL2006/00967.
Notice of Allowance dated Jun. 22, 2015 From the US Patent and Trademark Office Re. US Appl. No. 11/990,629.
Office Action dated Apr. 3, 2012 From the Israel Patent Office Re. Application No. 189563 and Its Translation Into English.
Office Action dated Jan. 21, 2014 From the Israel Patent Office Re. Application No. 189563 and Its Translation Into English.
Official Action dated Feb. 1, 2012 From the US Patent and Trademark Office Re. U.S. Appl. No. 11/990,629.
Official Action dated Sep. 9, 2010 From the US Patent and Trademark Office Re. U.S. Appl. No. 11/990,629.
Official Action dated Mar. 16, 2011 From the US Patent and Trademark Office Re. U.S. Appl. No. 11/990,629.
Official Action dated Nov. 21, 2012 From the US Patent and Trademark Office Re. U.S. Appl. No. 11/990,629.
Official Action dated Mar. 31, 2014 From the US Patent and Trademark Office Re. U.S. Appl. No. 11/990,629.
Bandara et al. "Design and Implementation of a Bluetooth Signal Strength Based Location Sensing System", Radio and Wireless Conference, 2004 IEEE, p. 319-322, 2004.
Office Action dated Mar. 6, 2016 From the Israel Patent Office Re. Application No. 238041 and Its Translation Into English.

* cited by examiner

SYSTEM INCLUDING A PORTABLE STORAGE DEVICE EQUIPPED WITH A USER PROXIMITY DETECTOR AND METHOD OF PREVENTING THE LOSS THEREOF

RELATED APPLICATIONS

This Application is a continuation of U.S. patent application Ser. No. 11/990,629 filed on Feb. 19, 2008, which is a National Phase of PCT Patent Application No. PCT/IL2006/000967 having International Filing Date of Aug. 20, 2006, which claims the benefit of priority of U.S. Provisional Patent Application No. 60/709,125 filed on Aug. 18, 2005. The contents of the above Applications are all incorporated herein by reference.

FIELD AND BACKGROUND OF THE INVENTION

The present invention relates to a portable memory device and, more particularly but not exclusively, to a portable flash memory device equipped with a loss prevention mechanism.

During the last few years, the usage of portable flash memory devices has dramatically increased worldwide. One of the most common portable flash memory devices is a flash memory card that is integrated with an interface that plugs into a computer's USB port. The USB flash drive is essentially a NAND-type flash memory integrated with a USB 1.1 or 2.0 interface. It is a small, lightweight, removable and rewritable data storage device of up to 64 GB. The USB flash drives are faster and more reliable than floppy disks which were previously used for relatively quick portable storage.

The portable flash memory device emulates a small disk drive and allows data to be easily transferred from one computing unit to another. The portable flash memory device usually consists of a small printed circuit board encased in a plastic or metal casing, making the drive sturdy enough to be carried about in a pocket or on a lanyard. Usually only the USB connector protrudes from the casing, and the connector is usually covered by a removable cover. Most flash drives feature the standard type-A USB connection allowing them to be connected directly to a port on a personal computer. Most flash drives are active only when powered by a USB computer connection, and require no other external power source or battery power source. Key drives are run off the limited supply afforded by the USB connection. To access the data stored in a flash drive, the flash drive has to be connected to a computer. Software drivers are not required for the latest operating systems, but are available on the Web for legacy systems such as Windows 98, Windows NT and Mac OS 8.

Unlike a floppy disk, a compact disc (CD), a digital versatile disc (DVD) or any other writable storage medium which is commonly used for creating a backup copy or a copy for delivery, the portable flash memory device is commonly used as a portable rewritable storage device for the personal and business usage of its owner. Thus, the portable flash memory device commonly stores personal and confidential information. Such information may have high emotional and financial value to the owner of the portable flash memory device. Losing such a portable flash memory device may be a real problem to its owner. It should be noted that the standard portable flash memory device usually does not have any security protection and anyone finding it can access all the data and furthermore use the device at his own will.

Few solutions for the general problem of losing objects are known. For example, U.S. Pat. No. 6,297,737, issued on Oct. 21, 2001 to D. Irvin, discloses an object locating system. The system includes a locating unit that comprises a wireless communication interface for transmitting signals to one or more locating tags. When a tagged item is misplaced, a signal is transmitted from the locating unit. When the tag receives the signal, an alarm is sounded. Additionally, the tag sends a response that is received by the locating unit to give an indication that the tagged item is nearby, even if the audio alarm cannot be heard.

Another solution is found in U.S. Patent Publication No. 2003/0034887, published on Feb. 20, 2003. U.S. Patent Publication No. 2003/0034887 discloses an article locator system that employs a tracking transceiver and a handheld locator device. The tracking transceiver is attached to the tracked article and is configured to send a response when it is signaled by the handheld locator device. The handheld locator device determines the distance and/or direction to the tracking transceiver. Although the aforementioned solutions, which relate to the general problem of losing objects, can be adopted for tracking a lost portable flash memory device, none of them can prevent its actual loss. Moreover, the known solutions for the general problem of losing objects usually integrate a locating unit. Such a unit must be accessible to the owner of the lost portable flash memory device in order to allow him to perform the search. Thus, by adopting such a solution they require the owner to carry such a generic locating unit to any place at which he might lose his portable flash memory device.

In addition, the locating tag, which is used in such solutions to indicate where the lost article can be found, is designed to be externally attached to the article, for example the portable flash memory device. Therefore, attaching such a locating tag to the portable flash memory device changes its structure, outer surface and appearance. Moreover, the locating tag is generic and therefore not adjusted to interface with components of the portable flash memory device. Such a structure clearly limits the ability of the locating tag to interface with the memory and the memory control unit of the portable flash memory device.

There is thus a widely recognized need for, and it would be highly advantageous to have, a portable flash memory device with a loss-prevention mechanism which is devoid of the above limitations.

SUMMARY OF THE INVENTION

According to one aspect of the present invention there is provided a portable storage system. The system comprises a portable storage device and a loss-prevention unit. The system further comprises a Master and Slave proximity elements. One of the proximity elements is physically connected with the portable storage device. The other of the proximity elements is physically connected with the loss-prevention unit. The Master proximity element is configured to poll in a wireless manner the proximity of the Slave proximity element within a predefined proximity threshold.

Preferably, the portable storage device has a flash memory element.

More preferably, the portable storage device further comprises a data-transferring interface electrically connected with the flash memory element; the data-transferring interface is configured to be coupled to a hosting unit.

Preferably, the portable storage system further comprises a user indication element electrically connected with the Master proximity element, the user indication element configured to activate an alarm when triggered.

More preferably, the Master proximity element is configured to trigger the user indication element when the Slave proximity element is not detected within the predefined proximity threshold.

More preferably, the user indication element comprises a timer element operable to delay the trigger for a predefined time interval, the predefined time interval starting when the Slave proximity element is not within the predefined proximity threshold.

More preferably, the alarm comprises at least one member of the following group: an audible alarm, a visual alarm, and a tactile alarm.

More preferably, the alarm comprises a wireless communication transmitter configured to transmit an alarming message to a wireless communication receiver.

More preferably, the visual alarm is performed using a light emitting diode (LED).

More preferably, the tactile alarm is performed using a vibrating unit.

Preferably, the Master proximity element is a network of sensors is configured to wirelessly poll the proximity of the Slave proximity element within a predefined area.

Preferably, the Slave proximity element is a network of proximity elements, wherein the Master proximity element is configured to wirelessly poll the proximity of each one of the proximity elements within a predefined proximity threshold, thereby determining whether the Master proximity element is located within the boundaries of a predefined area.

Preferably, the portable storage system further comprises a encrypting module electrically connected with the flash memory element and the Master proximity element, wherein the Master proximity element is configured to trigger the encrypting module when the Slave proximity element is not detected within the predefined proximity threshold, the encrypting module is configured to encrypt information stored on the flash memory element when triggered.

Preferably, the loss-prevention unit is adapted to be detachably coupled to the portable storage device.

More preferably, the data-transferring interface is a member of the following group: a Universal Serial Bus (USB) connector, a wireless communication unit, an USB2 connector, and a FireWire™ connector.

More preferably, the portable storage device comprises a case within which the flash memory element and at least a portion of the data-transferring interface are mounted.

More preferably, the loss-prevention unit is shaped as a cover for a portion of the data-transferring interface, which projects from the portable storage device.

Preferably, the portable storage system further comprises a communication module electrically connected with the data transferring interface and the Master proximity element, wherein the Master proximity element is configured to trigger the communication module when the Slave proximity element is not detected within the predefined proximity threshold, the communication module is configured to instruct the hosting computing unit to send a message to a predefined address.

More preferably, the predefined address is a member of the following group: an email address, a phone number, and a pager number.

More preferably, the message address is a member of the following group: a Short Message Service (SMS), pager message, an electronic message, a voice message, a visual message, and a tactile message.

More preferably, the communication module is configured to instruct the hosting computing unit to activate a designated protection application; the designated protection application is configured to protect information stored on the memory of the hosting computing unit.

More preferably, the protect address is a member of the following group: encrypt, lock access, and delete.

Preferably, the Slave proximity element is connected to a battery.

Preferably, one of the Master and Slave proximity elements comprises a transmitter, and the other of the Master and Slave proximity elements comprises a receiver adapted for communication with the transmitter.

More preferably, the transmitter is configured for broadcasting an RF signal to the receiver, the receiver is configured for receiving the RF signal.

More preferably, the transmitter is a radio frequency identification (RFID) transmitter, and the receiver is an RFID receiver.

More preferably, the transmitter is a Infrared (IR) transmitter, and the receiver is an IR receiver.

More preferably, the transmitter and the receiver perform radio communication according to a Bluetooth® communication protocol.

More preferably, the transmitter is a transponder and the receiver is a transceiver, the transmitter configured for broadcasting the RF signal as a reply signal to an interrogation signal of the transmitter.

According to one aspect of the present invention there is provided a method for preventing the loss of a portable storage device. The method comprises the following steps: a) determining whether the portable storage device is coupled to a loss-prevention unit, b) if the portable storage device is not coupled to the loss-prevention unit, determining whether the distance between the portable storage device and the loss-prevention unit is within a predefined proximity threshold, and c) activating an alarm if the portable storage device is not within the proximity threshold.

Preferably, the activating is done a predefined period after the portable storage device has been separated from the loss-prevention unit.

According to one aspect of the present invention there is provided a portable storage device that comprises a main body including a flash memory element and a first proximity element configured to communicate with a second proximity element. One of the proximity elements is configured to wirelessly poll the presence of the other of the proximity elements within a predefined range.

Preferably, the second proximity element is coupled to a detachable cover which is adjusted to fit a portion projecting from the portable storage device.

Preferably, the portable storage device of claim 32 further comprises a user indication element electrically connected with one of the first and second proximity elements, the user indication element configured to activate an alarm when triggered.

Preferably, the one of the proximity elements is configured to trigger the user indication unit when the other of the proximity elements is not detected within the predefined range.

Preferably, the user indication unit comprises a timer element operable to delay the trigger for a predefined time interval, the predefined time interval starting at when the other of the proximity elements is not detected within the predefined range.

Preferably, the alarm comprises at least one member of the following group: an audible alarm, a visual alarm, and a tactile alarm.

According to one aspect of the present invention there is provided a portable storage system that comprises a portable storage device having stored content, a loss-prevention unit, and Master and Slave proximity elements. The Master proximity element is physically connected with the portable storage device. The Slave proximity element is physically connected with the loss-prevention unit. The Master proximity element is configured to operate the portable storage device to protect the stored content when the Slave proximity element is outside a predefined proximity threshold.

According to one aspect of the present invention there is provided a portable storage system that comprises a portable storage device having stored content, a loss-prevention unit, and Master and Slave proximity elements. The Master proximity element is physically connected with the portable storage device. The Slave proximity element is physically connected with the loss-prevention unit. The Master proximity element is configured to operate the portable storage device to issue a network communication to alert an owner when the Slave proximity element is outside a predefined proximity threshold.

Unless otherwise defined, all technical and scientific terms used herein have the same meaning as commonly understood by one of ordinary skill in the art to which this invention belongs. The materials, methods, and examples provided herein are illustrative only and are not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE SEVERAL VIEWS OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1:
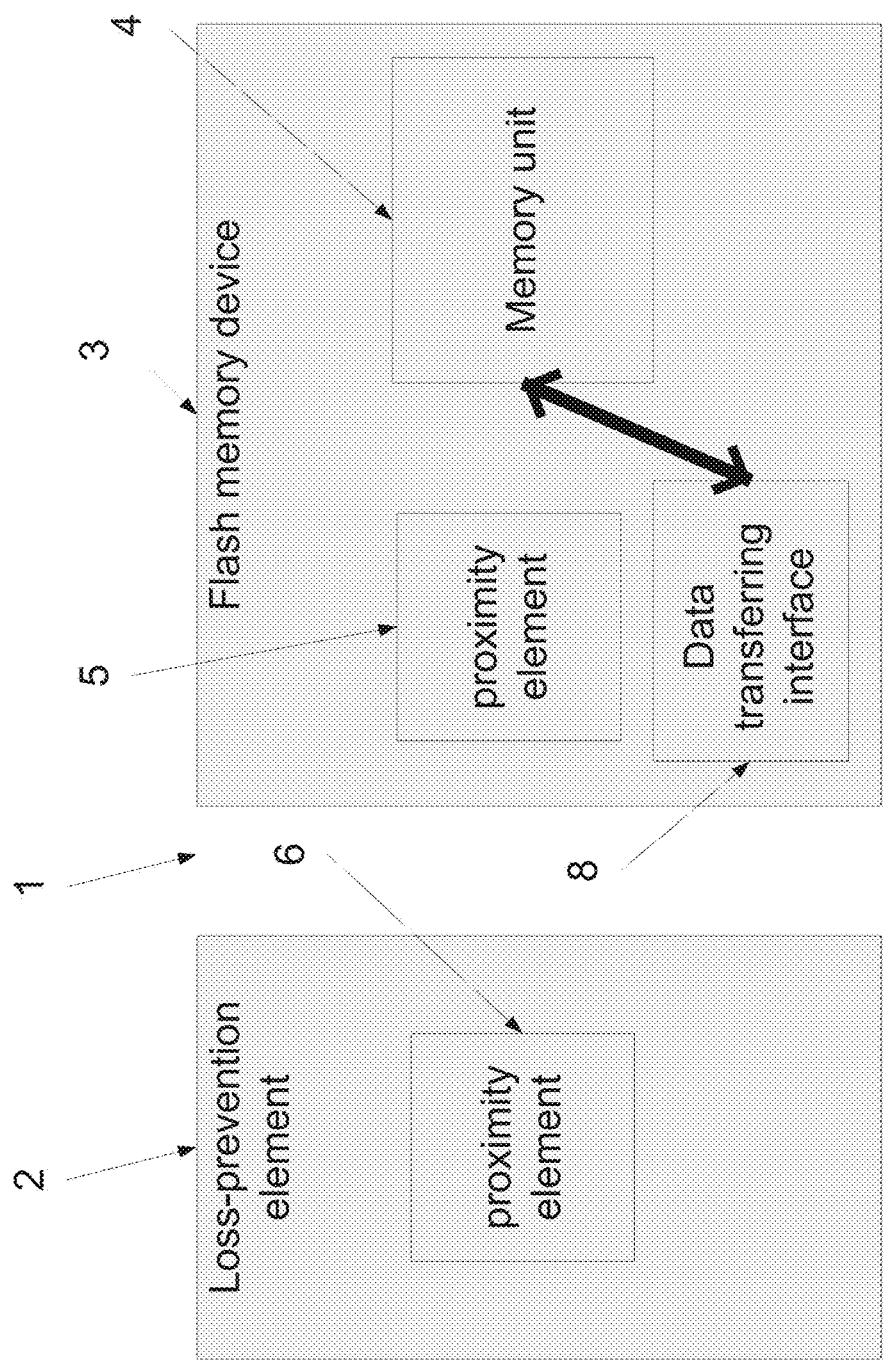
FIG. 1 is a perspective view of an exemplary portable flash memory system which comprises a flash memory device and a loss-prevention element, according to an embodiment of the present invention.

The present embodiments comprise an apparatus, a system and a method for a portable memory device having an integrated loss-prevention mechanism.

The principles and operation of an apparatus, system and method according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

One embodiment of the present invention is related to a portable storage system, with a loss-prevention mechanism. The system comprises a portable storage device, such as a USB drive, that includes a flash memory element, such as a non-volatile memory that can be electrically erased and reprogrammed. The system further comprises a loss-prevention element which is configured to be retained by the user when the portable storage device is in use. In one embodiment of the present invention, the loss-prevention element is shaped as a cover to the portable storage device. In such an embodiment, the portable storage device has a standard USB connecter, as in commonly used USB drives, and the loss-prevention element is shaped to cover the projected portion thereof. The loss-prevention mechanism of the portable storage system comprises Master and Slave proximity elements. One of the proximity elements is physically connected to the portable storage device. The other is physically connected to the loss-prevention element. The Master proximity element is configured to wirelessly verify the presence of the Slave proximity element within a predefined range. The Master proximity element is, preferably, electrically connected to a user indication unit which is used to inform the user about a potential loss. The user indication unit triggers an integrated alarm when the loss-prevention element is removed and is located a sufficient distance away from the flash memory device.

Another embodiment of the present invention is related to a method for preventing the loss of a portable storage device. The method comprises a number of steps. In the first step, it is determined whether the portable storage device is coupled to a loss-prevention element. If the portable storage device and the loss-prevention element are not coupled, then it is determined whether the distance between the portable storage device and the loss-prevention element is within a predefined range. If the distance between the portable storage device and the loss-prevention is not within the predefined range, then an alarm is activated.

Reference is now made to FIG. 1, which depicts a portable flash memory system 1 that comprises a flash memory device 3 and a loss-prevention element 2, according to an embodiment of the present invention.

The flash memory device 3 comprises a memory unit 4 and a data-transferring interface 8. The memory unit 4 is, preferably, a flash memory which is a constantly-powered nonvolatile memory. The flash memory is an EEPROM (Electrically Erasable Programmable Read Only Memory) which is erasable and modifiable at the block level, so that performance speed is fast. Such flash memory is currently in use in a variety of apparatuses and systems, including digital cellular phones, digital cameras, LAN (Local Area Network) switches, PC cards, and digital setup boxes or inner controllers for notebook computers. The memory unit 4 is electrically connected to the data-transferring interface 8 that allows external computing units, such as personal and portable computers, to access the information which is stored in the memory unit 4. Preferably, the data-transferring interface 8 comprises a USB connector, as defined in USB 1.0, USB 1.1 or USB 2.0 specifications that are herein incorporated in their entirety by reference. The data-transferring interface 8 further comprises a USB controller which is used to manage the logical channels of the USB connector. The logical channels are configured as byte streams in order to allow external computing units to access and communicate with the memory unit. Preferably, the portable flash memory system 1 is configured to function as a commonly known USB drive. When the user plugs the USB connector into a USB port, the computer's operating system recognizes the device as a removable drive and assigns it a drive letter. Such a jump drive does not require rebooting after it is attached and supplies power to the flash memory device 3. As such, additional features such as password protection and downloadable drivers may be integrated into the flash memory device 3.

The portable flash memory system 1 further comprises two proximity elements, 5 and 6, integrated into the flash memory device 3 and the loss-prevention element 2, respectively. The two proximity elements 5, 6 are configured in a manner that allows at least one of them to wirelessly determine the presence of the other within a predefined range. As further described below, the interrogation process is initiated only when the loss-prevention element 2 is separated from the flash memory device 3. For the sake of simplicity and clarity, the proximity element which is configured to determine the presence of the other proximity element in a predefined range is defined as a Master proximity element, and the other proximity element is defined as a Slave proximity element.

In one embodiment of the present invention, the Slave proximity element is a transmitting circuit and the Master proximity element is a receiving circuit. Such proximity elements 5, 6 allow the establishment of a wireless communication path between the flash memory device 3 and the loss-prevention element 2. The wireless communication path allows the transmission of data by the transmitting circuit in a manner that provides location information to the receiving circuit. Such an embodiment allows the receiving circuit to interrogate the presence of the transmitting circuit within a predefined range, preferably according to the strength of the transmitting circuit's transmissions. Thus, if the transmitting circuit is integrated into flash memory device 3 and the receiving circuit is integrated into the loss-prevention element 2, the loss-prevention element 2 can be used to interrogate the presence of the flash memory device 3 within a predefined range, and vice versa.

Preferably, the transponder and receiving circuits are configured as parts of a radio frequency identification (RFID) system. The transmitting circuit comprises a radio frequency (RF) transponder with a digital memory chip. The receiving circuit comprises an RF antenna. When activated, the RF transponder sends an RF signal to the RF antenna of the receiving circuit. The RF signal preferably comprises a unique identification code. It should be noted that the RF transponder may be activated by a wireless interrogation signal, sent by the receiving circuit, or by a wireline signal, sent from a presence detection unit, as described below. The receiving circuit verifies that the identification code is registered as related to the memory main body. The reception of the RF signal at a certain strength indicates to the receiving circuit that the transmitting circuit is within the predefined range. In such an embodiment, as depicted in FIG. 3, the Master proximity element 6 further comprises a user indication unit 7 that is electrically connected to a receiving circuit and configured to be triggered thereby. Preferably, if the receiving circuit does not receive the identified RF signal or receives a weak identified RF signal, the receiving circuit triggers the user indication unit. Thus, when a loss-prevention element 2 is moved a sufficient distance away from the flash memory device 3, the Master proximity element 6 no longer receives the RF signal of the Slave proximity element 5 and therefore triggers the user indication unit.

In another embodiment of the present invention, the Slave proximity element is a Bluetooth® (BT)-Slave element and the Master proximity element is a BT-Master element. It should be noted that the term BT-element might refer to a short-range radio communication device in a short-range area, which communicates using the BT protocols.

Figure 2:
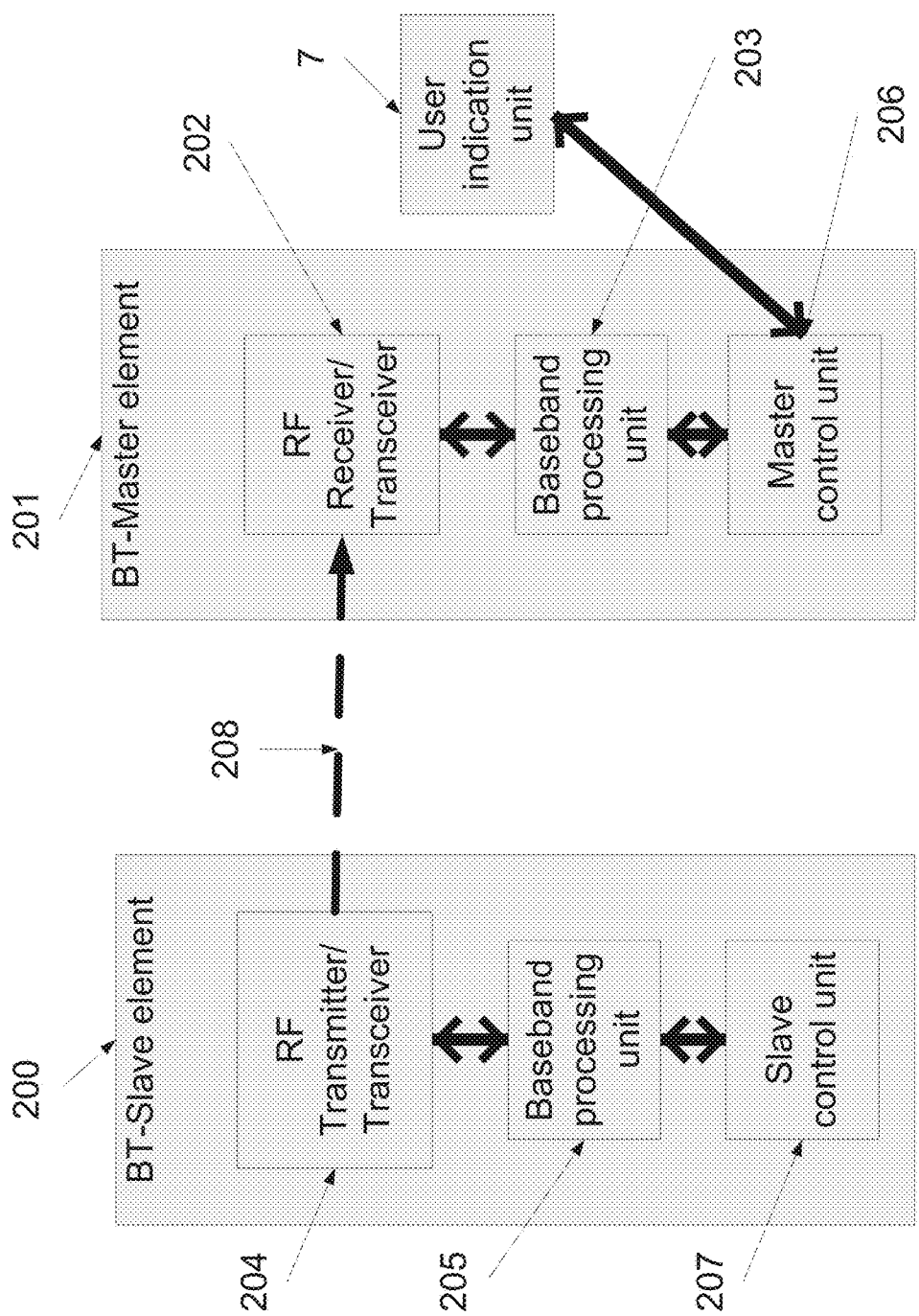
FIG. 2 is a perspective view of the loss-prevention mechanism that comprises Master and Slave Bluetooth® elements, according to an embodiment of the present invention.

Reference is now made to FIG. 2, which depicts Master 201 and Slave 200 BT elements, according to an embodiment of the present invention. When activated, the Master BT-element 201 is configured to detect the presence of the Slave BT-element 200 within a predefined range. If the Slave BT-element 200 is not detected, the Master BT-element 201 triggers the user indication unit. The trigger prompts the user indication unit to alarm the user, as further described below.

Each one of the BT-elements comprises a communication element. The BT-Master element preferably comprises an RF receiver 202 and the BT-Slave element preferably comprises an RF transmitter 204. It should be noted that transceivers may be used instead of the receiver 202 and transmitter 204. Each one of the communication elements 202 and 204 is electronically connected to a baseband processing unit 203 and 205, respectively. Each one of the baseband processing units 203 and 205 is connected to a respective control unit 206 and 207, which is configured to transmit data in packets. The RF transmitter 204 is configured to modulate encoded packets received from baseband processing unit 205 to a predetermined frequency band for radio transmission, to amplify and to transmit the modulated data packet. Preferably, the RF receiver 202 is configured to receive, and preferably amplify, received signals of a predetermined frequency band. It should be noted that each one of the communication elements may be a transceiver which is configured both as a receiver and as a transmitter. When activated, the Slave control unit 207 is configured to establish a baseband transmission to the Master BT-element 201. The connection is established by instructing the Slave RF transmitter 204 to send an RF signal 208 to the Master RF receiver 202. The Master control unit 206 periodically checks the RF power level of the RF signal 208 that is received through the Master RF receiver 202. Then, the Master control unit 206 determines whether the measured RF power level of the RF signal 208 is less than a predetermined level. In one embodiment of the present invention, the predetermined level corresponds to a receiving level that the Master RF receiver 202 receives from the Slave RF transmitter 204 when the distance between the flash memory device and the loss prevention element is about 10 meters, or alternatively one or two meters or any suitable distance. If the power level of the RF signal 208 is less than the predetermined level, the Master RF receiver 202 triggers the user indication unit 7.

In another embodiment of the present invention, the Slave proximity element is an Infrared (IR) transmitter and the Master proximity element is an IR receiver.

Figure 3A:
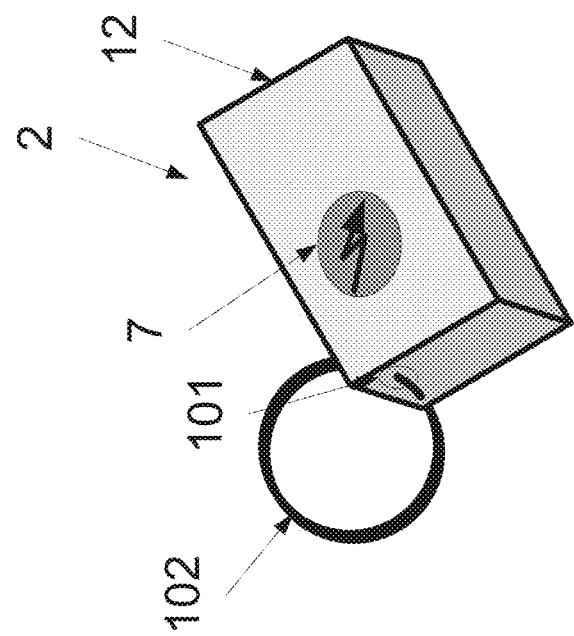
FIG. 3A is a perspective view of the components of an exemplary portable flash memory system, showing the top surface thereof, according to a preferred embodiment of the present invention.
Figure 3A:
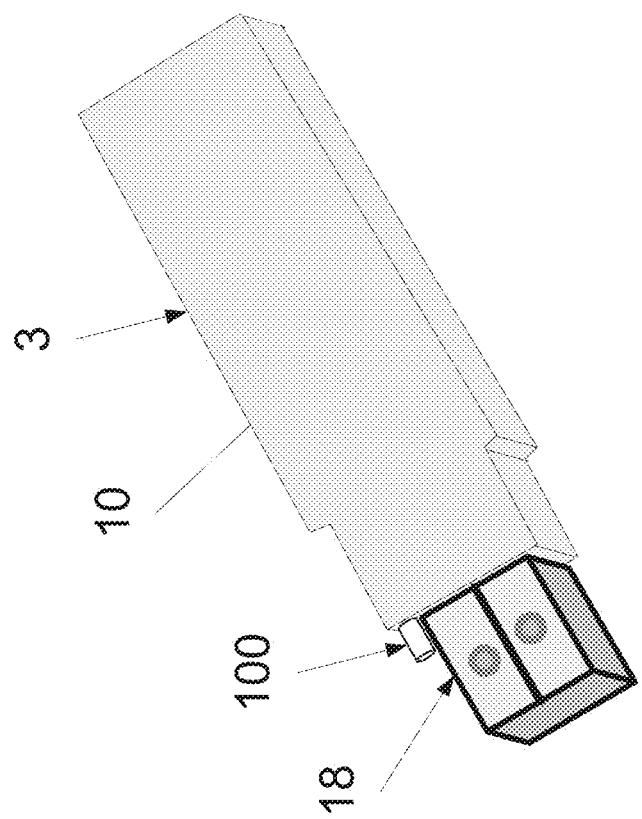
Figure 3B:
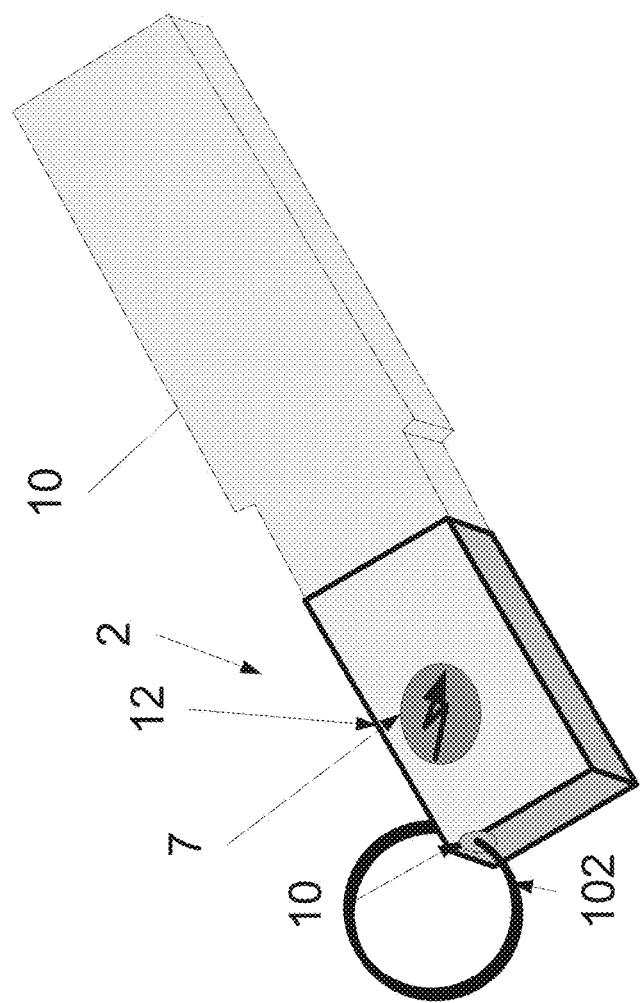
FIG. 3B is a perspective view of the portable flash memory system of FIG. 3A when the flash memory device and the loss-prevention element are coupled, according to a preferred embodiment of the present invention.

Reference is now made to FIGS. 3A and 3B, each of which is a perspective view of the remote portable flash memory system 1 represented in FIG. 1. In FIG. 3A, the flash memory device 3 comprises a durable housing 10 that encompasses the memory unit 4 (FIG. 1) and a part of the data-transferring interface 8 (FIG. 1). In the depicted embodiment, the data-transferring interface is a USB connector 18, which is electrically connected with the memory element in the inside of the housing 10. The USB connector 18 projects from the front end of the flash memory device 3. Moreover, in the embodiment that is depicted in FIG. 3A, the loss-prevention element 2 is shaped as a detachable cover 12, where the detachable cover 12 is forcibly fitted to cover the projected portion of the USB connector 18.

The portable flash memory system is designed to provide a user with a loss prevention mechanism that can minimize the chances of losing the device or of exposing the information stored therein to unauthorized users. As described above, the portable flash memory system 1 (FIG. 1) comprises two proximity elements. One of the proximity elements is attached to the flash memory device 3 and the other is attached to the loss-prevention element 2 shaped as a detachable cover 12. Preferably, when the flash memory device 3 and the detachable cover 12 are coupled, the loss prevention mechanism is disabled. Only when they are separated, the loss prevention mechanism is activated and one of the proximity elements starts determining the presence of the other proximity element, as described above. Preferably, the portable flash memory system 1 comprises a proximity or presence arrangement. Such arrangements are predominantly used with safety devices. The proximity or presence arrangement is configured to detect when the detachable cover 12 and the flash memory device 3 are coupled, as shown in FIG. 3B or are separated, as shown in FIG. 3A. Preferably, the arrangement comprises a presence switch 100, which is mounted on the flash memory device 3, to sense the presence of the detachable cover 12. When the presence switch 100 senses the detachable cover 12, the loss prevention mechanism is disabled.

In use, when the detachable cover 12 is separated from the flash memory device 3, as shown in FIG. 3A, the loss prevention mechanism is activated. In one embodiment of the present invention, the proximity element of the detachable cover 12 is configured as the Master element and the proximity element of the flash memory device 3 is configured as the Slave proximity element. In such an embodiment, the Master proximity element is electrically coupled to a user indication unit 7, which is used to inform the user when the detachable cover 12 is moved a sufficient distance away from the flash memory device 3. The user indication unit 7 preferably comprises a control circuit and an alarm. The control circuit is used to translate the outputs of the Master proximity element to trigger the user indication unit 7 alarm. The alarm is a device that is configured to alert the user. In FIGS. 3A and 3B the user indication unit 7 is a LED, preferably red. Preferably, when activated, the LED flashes On and Off. However, many other alarms may be used. The alarm may provide an audible, visual, or tactile stimulus. The audible stimulus may be produced using a miniature speaker or buzzer or other sound source. The visual stimulus may be produced using a light source, as depicted in FIGS. 3A and 3B. The tactile stimulus may be produced using a vibrating module. The user indication unit 7 may comprise a combination of alarms in order to ensure that the user is alerted. A battery or other portable power supply provides power for the user indication unit 7. In one embodiment, the user indication unit 7 comprises a Bluetooth® transmitter. The Bluetooth® transmitter is configured to send a message to a paired device, such as the user mobile phone or personal digital assistant (PDA) when the detachable cover 12 is moved a sufficient distance away from the flash memory device 3.

Preferably, the user indication unit 7 comprises a timer module. The timer module is configured to delay the activation of the alarm for a predefined period. Such an embodiment reduces the chances that the alarm will be activated when there is a lack of communication between the proximity elements for a short time or when the proximity elements are drawn away from each other for a short period of time.

The timer module is configured to interrupt the control circuit of the user indication unit 7 for a predefined amount of time after the Master proximity element triggers the user indication unit 7. The timer module is reset when the Master proximity element senses the presence of the Slave proximity element. If the presence of the Slave proximity element is not sensed, the control circuit is reconnected and a control signal causes the control circuit to activate the alarm. For example, in one embodiment of the invention, the timer module delays the activation of the alarm if, for half or one minute after the user indication unit 7 has been triggered, the presence of the Slave proximity element is not sensed.

Preferably, as shown in FIGS. 3A and 3B, the detachable cover 12 has an opening 101 configured to receive a key ring 102. Such a key ring 102 can be used to couple the detachable cover 12 to a key holder, a cloth, or another article in order to avoid losing the detachable cover 2. In such an embodiment, losing of both the detachable cover 12 and the flash memory device 3 can be avoided.

It should be noted that the portable flash memory system 1 can be used as a loss-prevention mechanism for a coupled computer unit. As described above, the portable flash memory device 3 is configured to be plugged into a suitable port, such as a USB port in a computing unit. As further described above, if the presence of the portable flash memory device 3 is not detected within the predefined range relative to the loss-prevention element 2, the loss-prevention element 2 activates an alarm. Thus, if the flash memory device 3 is plugged into a portable computing unit such as a laptop, and the portable computing unit is taken away from the user, the alarm is activated, as described above, notifying the owner of the portable computing unit about the potential loss.

Figure 4:
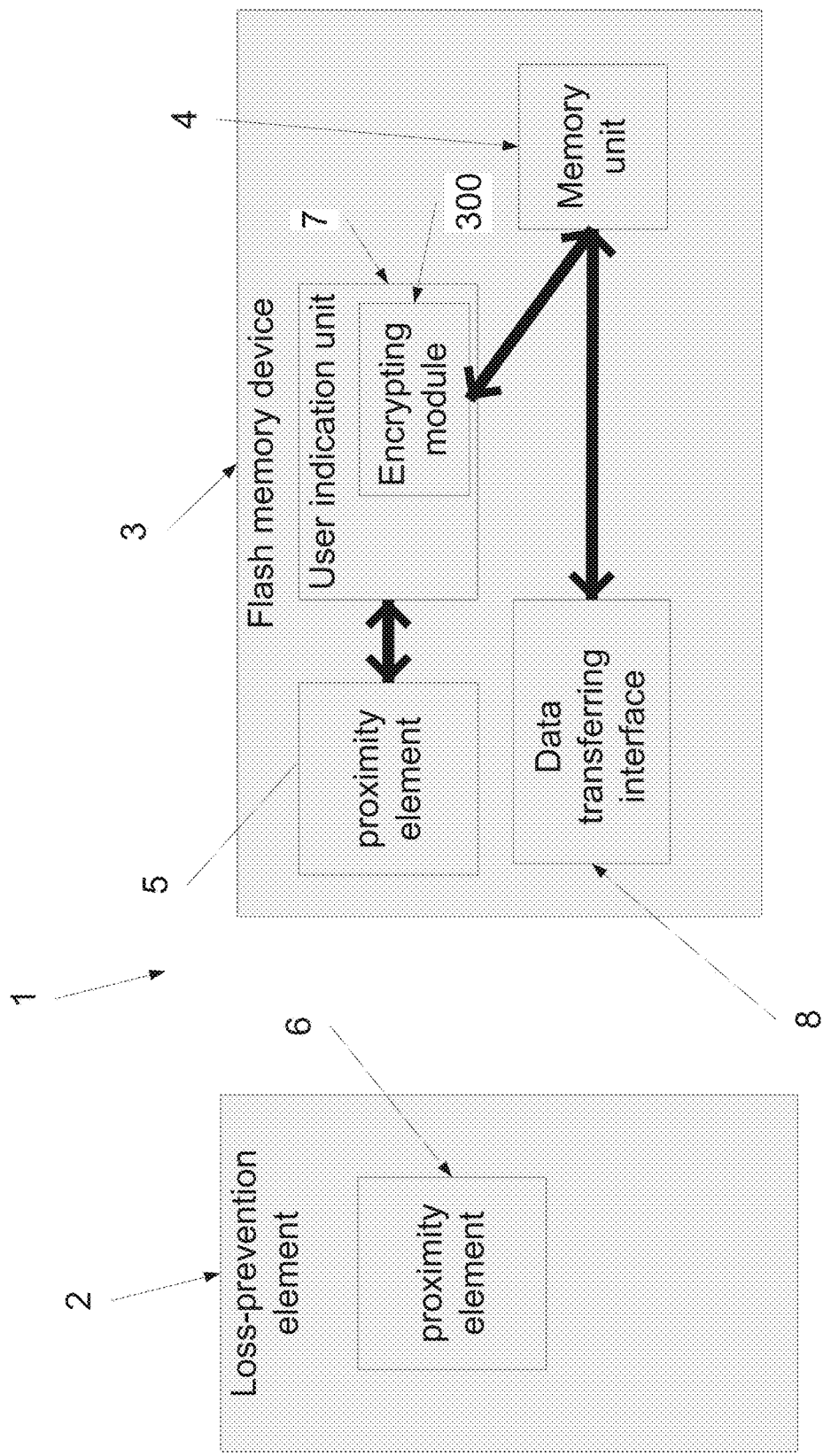
FIG. 4 is a perspective view of an exemplary portable flash memory system in which a user indication unit is connected to a proximity element at the flash memory device, according to an embodiment of the present invention.

Reference is now made to FIG. 4, which depicts another embodiment of the present invention. The memory unit 4, the data transferring interface 8, and the proximity elements 5, 6 are as in FIG. 1 above. However, in the present embodiment, a user indication unit 7 is electrically connected to the proximity element 5 of the flash memory device 3. In such an embodiment, the user indication unit 7 may alert the user, as described above, when the presence of the Slave proximity element is not detected within a predefined range. In such an embodiment, the proximity element 6 of the loss prevention element 2 is the Slave element and the proximity element 5 of the flash memory device 3 is the Master proximity element 6.

As described above, the portable flash memory system 1 may be used as a common plug-and-play portable storage device. A common plug-and-play portable storage device is used when coupled to a computing unit. The computing unit is used for accessing the information that is stored in the memory unit 4. In order to couple the portable flash memory system 1 to a computing unit, the user plugs the device into a suitable port, such as a USB port, in the computing unit. When coupled, the computer's operating system recognizes the device as a removable drive and assigns it a drive letter. The coupling allows the user of the computing unit to access information stored on the memory unit. Allowing such access can be undesirable if the portable flash memory system 1 has been forgotten when coupled to a certain computing unit that serves other users.

In one embodiment of the present invention, the user indication unit 7 is electronically connected to the main memory unit 4. The user indication unit 7 preferably comprises an encrypting module 300. When activated, the encrypting module 300 is configured to encrypt the information that is stored on the main memory unit 4. Such an embodiment ensures that unauthorized users cannot copy, delete or destroy any information which is stored on the memory unit 4.

As described above, the Master proximity element is configured to trigger the user indication unit 7 when the presence of the Slave proximity element is not detected within a predefined range or within a certain period of time after the presence of the Slave proximity element has not been detected within a predefined range. Preferably, the user indication unit 7 is configured to activate the encrypting module 300 when triggered. When activated, the encrypting module 300 encrypts the information that is stored on the memory unit 4, thereby preventing unauthorized users from accessing the information. In one embodiment of the present invention, the encrypting module 300 allows the owner of the portable flash memory system 1 to submit a certain password for decrypting the encrypted information. Preferably, the user indication unit 7 is configured to disable all the components of the main memory unit 4 until a password is inserted. Preferably, the user indication unit 7 is further configured to disable all the components of the main memory unit 4 until the presence of the loss-prevention element 2 is detected within the predefined range relative to the portable flash memory device 3. Such an embodiment promises that even if the password is stolen, the main memory unit 4 is not activated without the presence of the loss-prevention element 2.

In one embodiment of the present invention, the user indication unit 7 comprises a communication module (not shown) that is configured to communicate with the operating system of the coupled computer unit. The communication module is preferably electrically connected to the data-transferring interface 8 in a manner that allows it to communicate with the hosting computing unit, as described below. In such an embodiment, the communication module may be used, when activated, to instruct the operating system of the computing unit to initiate one or more processes that inform the owner of the portable flash memory system 1 as to the current location of the portable flash memory system 1. In such an embodiment, when the user indication unit 7 is triggered, the communication module instructs the operating system to send an email to a predefined address. Preferably, the communication module instructs the operating system to send a message to a central server. The central server is configured to send an email message, a short message service (SMS) message, a pager message, a tactile message, or another suitable message to a predefined address which may be accessed by the owner of the portable flash memory device 3. Preferably, the central server is configured to send the same message to more than one address or communication device.

It should be noted that in one embodiment of the present invention, per of Master and Slave proximity elements is coupled to the flash memory device 3 and another per of Master and Slave proximity elements is coupled to the loss prevention element 2. In such an embodiment, the user can be alarmed by a user indication unit 7 which is connected to the loss prevention element 2 while an encrypting module, which is connected to the flash memory device 3, may be used to encrypt the information that is stored on the main memory unit 4. Other functions, which are brought hereinabove, can also be parallelly performed.

In one embodiment of the present invention, the portable flash memory system 1 is used as a loss-prevention mechanism for the coupled computer unit. As described above, the portable flash memory system 1 integrates a communication module which is configured to communicate with the operating system of the coupled computer unit. Such a module can be used to instruct the operating system of the hosting device when the presence of the portable flash memory device 3 is not detected within the predefined range relative to the loss-prevention element 2. Such an embodiment can be useful when the computing unit is a laptop or another portable computing unit that can easily be forgotten or stolen. When the portable flash memory device 3 is plugged into a suitable port, such as a USB port, in the portable computing unit, it can communicate with the operating system of the portable computing unit. Preferably, the portable computing unit hosts a designated protection application which can be used to block access to the memory of the portable computing unit or to activate other protection or locking measures to the information which is stored on the memory of the portable computing unit. In one embodiment of the present invention, when the presence of the loss-prevention element 2 is not detected within the predefined range relative to the portable flash memory device 3, the Master proximity element 5 triggers the communication module. The communication module instructs the operating system of the hosting device to activate the designated protection application. The designated protection application then locks the information stored on the memory of the computing device. Other functions, such as deleting, encrypting, or activating a password protection can be activated by the application in order to protect the stored information. Such an embodiment ensures that the information which is stored on the memory of the portable computing device is safe even when the user, with the loss-prevention element 2, draws away from the portable computing device. In such an embodiment, if the portable computing device is stolen, the information which is stored in the portable computing device memory is safe.

In one embodiment of the present invention, the presence of the portable flash memory device 3 is configured to be detected within the boundaries of a area which is covered using a presence detection network. Preferably, the presence detection network comprises a number of Master proximity elements which are used to determine whether one or more flash memory devices are located within the boundaries of the presence detection network. Such an embodiment may be used to assist a security manager of a certain company in supervising on the remaining of the one or more flash memory devices in a certain area. The presence detection network is preferably connected to a user indication element which is used to alarm the security manager when the presence of one or more of the flash memory devices is not detected within the boundaries of the detection network. In another embodiment of the present invention, the presence detection network comprises a number of Slave proximity elements. In such an embodiment, each one of the flash memory devices is configured to determine whether it is located within the boundaries of the of Slave proximity elements' network. In such an embodiment the flash memory device 3 may be connected to an encrypting module which is configured to encrypt information stored on the flash memory element when the flash memory device 3 is removed from the boundaries of the Slave proximity elements' network.

Figure 5:
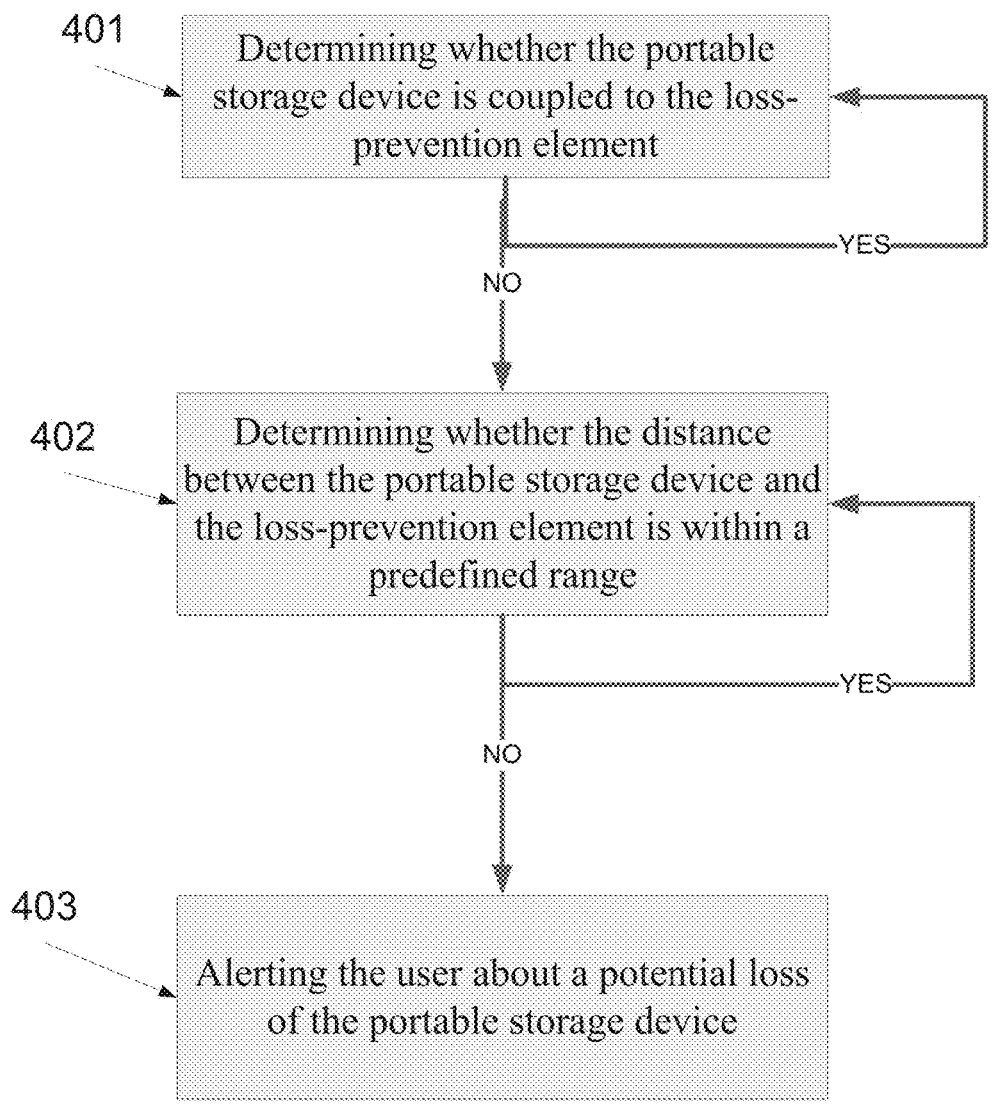
FIG. 5 is a simplified flowchart diagram of a three-step process for providing a method for preventing the loss of a portable flash memory device, according to a preferred embodiment of the present invention.

Reference is now made to FIG. 5, which is a flowchart that illustrates a three-step process for preventing the loss of a portable flash memory device, according to a preferred embodiment of the present invention. During the first step, 401, the system is checked to determine whether the portable storage device is coupled to the loss-prevention element. If the portable storage device and the loss-prevention element are not coupled, then, as shown at 402, it is determined whether the portable storage device is within a predefined range relative to the loss-prevention element. In one embodiment, as described above, a proximity element, which is coupled either to the portable storage device or to the loss-prevention element, is used to determine if another proximity element, which is attached to the other of the portable storage device or of the loss-prevention element, is present within a predefined range. In the following step, 403, if the presence of the portable storage device is not detected within the predefined range relative to the loss-prevention element, the user is alerted about a potential loss of the portable storage device.

It is expected that during the life of this patent many relevant devices and systems will be developed and the scope of the terms herein, particularly of the terms flash memory, packets, memory, interface are intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents, and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A portable storage system, comprising:
    at least one memory element storing a data protection application and user data, and
    a processing unit configured for executing said protection application to protect said user data,
    data-transferring interface physically and electronically connecting said at least one memory to a hosting computing unit; and
    a master proximity element adapted to wirelessly poll a proximity of a slave proximity element, said wirelessly polling is activated upon a detection of a detachment of said master proximity element from said slave proximity element;
    wherein said master proximity element is configured to trigger said data protection application to encrypt said user data when said slave proximity element is not detected within said proximity by said wireless polling; and
    wherein in response to said slave proximity element not being detected within said proximity by said wireless polling, said at least one memory element instructs an operating system of said hosting computer unit to encrypt information stored on a memory of said hosting computer unit.

2. The portable storage system of claim 1, wherein said memory element comprises a flash memory element.

3. The portable storage system of claim 1, wherein said master proximity element is configured to trigger and activation of an alarm when said slave proximity element is not detected within said proximity by said wireless polling.

4. The portable storage system of claim 3, wherein said alarm comprises at least one member of the following group: an audible alarm, a visual alarm, and a tactile alarm.

5. The portable storage system of claim 3, wherein said alarm comprises a wireless communication transmitter configured to transmit an alarming message to a wireless communication receiver.

6. The portable storage system of claim 1, further comprising a timer element operable to delay said trigger for a predefined time interval starting when said slave proximity element is not detected within said proximity by said wireless polling.

7. The portable storage system of claim 1, wherein said Master proximity element is a network of sensors being configured to wirelessly poll the proximity of said Slave proximity element within a predefined area.

8. The portable storage system of claim 1, wherein said Slave proximity element is a network of proximity elements, wherein said Master proximity element being configured to wirelessly poll the proximity of each one of said proximity elements within a predefined proximity threshold, thereby determining whether said Master proximity element is located within the boundaries of a predefined area.

9. The portable storage system of claim 1, wherein said portable storage device is one of a group comprising: a cellular phone, a digital camera, a LAN (Local Area Network) switch, a PC card, a digital setup box and an inner controller for notebook computers.

10. The portable storage system of claim 1, wherein said processing unit is further configured to input a password for deactivating a password protection of said user data in said memory, wherein said processing unit is configured to deactivate said password protection only if said Slave proximity element is detected in said proximity.

11. The portable storage system of claim 10, wherein said password is for decrypting data stored in said memory and encrypted by said data protection application.

12. The portable storage system of claim 10, wherein said password is for enabling components of said portable storage system disabled by said data protection application.

13. The portable storage system of claim 1, wherein said portable storage device is a plug-and-play portable storage device.

14. The portable storage system of claim 1, wherein said slave proximity element is stored in a loss-prevention unit adapted to be detachably coupled to said portable storage device.

15. The portable storage system of claim 14, wherein said loss-prevention unit is shaped as a cover for a portion of said data transferring interface which projects from said portable storage device.

16. The portable storage system of claim 1, wherein said data-transferring interface is a member of the following group: a Universal Serial Bus (USB) connector, a wireless communication unit, an USB2 connector, and a FireWire™ connector.

17. The portable storage system of claim 1, wherein said portable storage device comprises a case within which said memory element and at least a portion of said data-transferring interface are mounted.

18. The portable storage system of claim 1, further comprising a communication module electrically connected with said data transferring interface and said Master proximity element, wherein said Master proximity element is configured to trigger said communication module when said Slave proximity element is not detected within said proximity, said communication module being configured to instruct said hosting computing unit to send a message to a predefined address.

19. The portable storage system of claim 18, wherein said predefined address is a member of the following group: an email address, a phone number, and a pager number.

20. A method for preventing the loss of a portable storage device comprising a memory element for data storage, comprising:
   physically and electronically connecting at least one memory of a portable storage device having at least one processor to a hosting computing unit;
   allowing access to user data stored on said at least one memory from said hosting computing unit;
   wirelessly polling a proximity of a slave proximity element to said portable storage device while said access is allowed, said wirelessly polling is activated upon a detection of a detachment of said portable storage device from said slave proximity element;
   when said proximity is not detected, executing a data protection application by said at least one processor to encrypt said user data; and
   in response to said slave proximity element not being detected within said proximity by said wireless polling said processor of said portable storage device instructs an operating system of said hosting computer unit to encrypt information stored on a memory of said hosting computer unit.

* * * * *